No. 727,298. PATENTED MAY 5, 1903.
G. G. CONVERS & A. B. DE SAULLES.
APPARATUS FOR PRODUCING ZINC DUST.
APPLICATION FILED SEPT. 14, 1898.
NO MODEL. 2 SHEETS—SHEET 1.
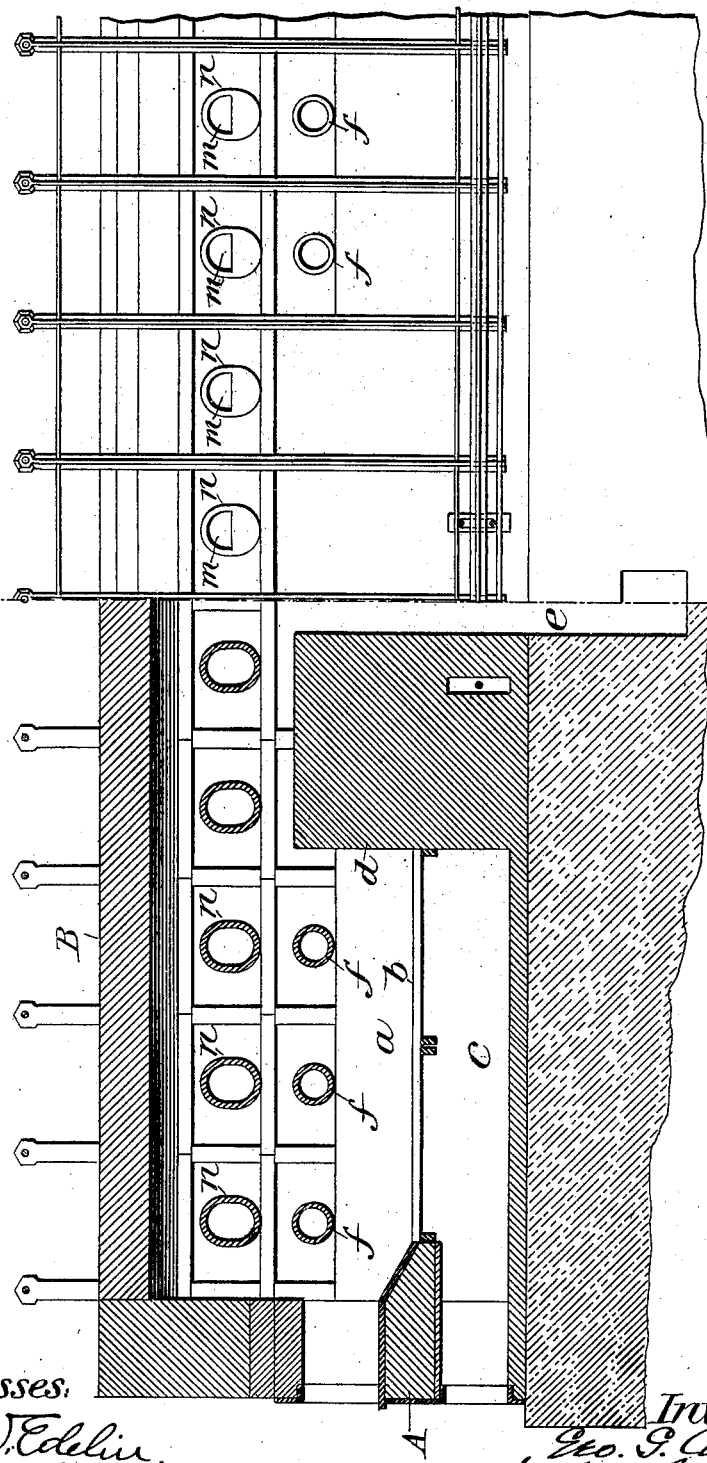
Witnesses:
D. W. Edelin.
E. M. Young.
Inventors.
Geo. G. Convers,
Arthur B. deSaulles,
by Pennie & Goldsborough,
Attys.

No. 727,298. PATENTED MAY 5, 1903.
G. G. CONVERS & A. B. DE SAULLES.
APPARATUS FOR PRODUCING ZINC DUST.
APPLICATION FILED SEPT. 14, 1898.
NO MODEL. 2 SHEETS—SHEET 2.
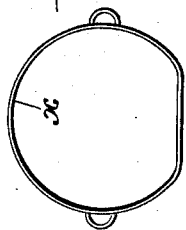
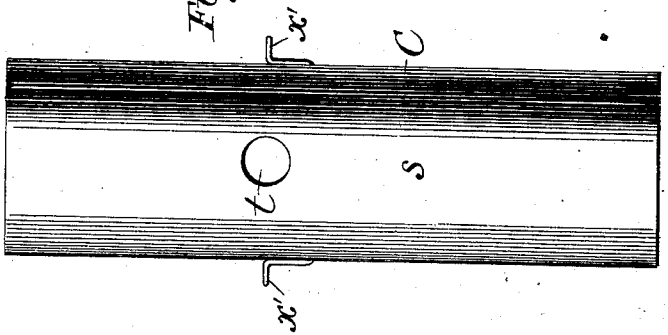
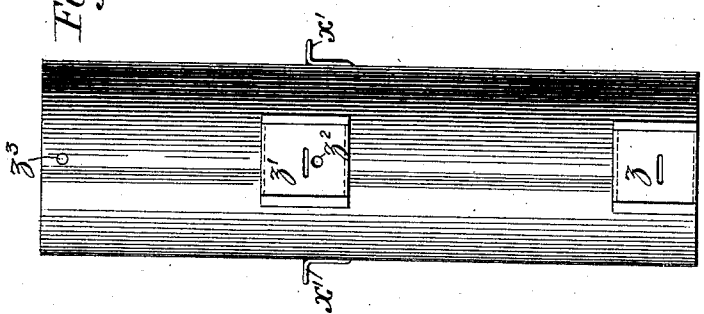
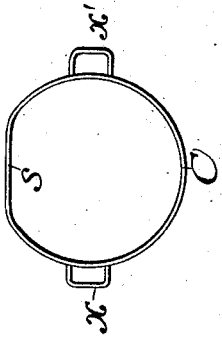
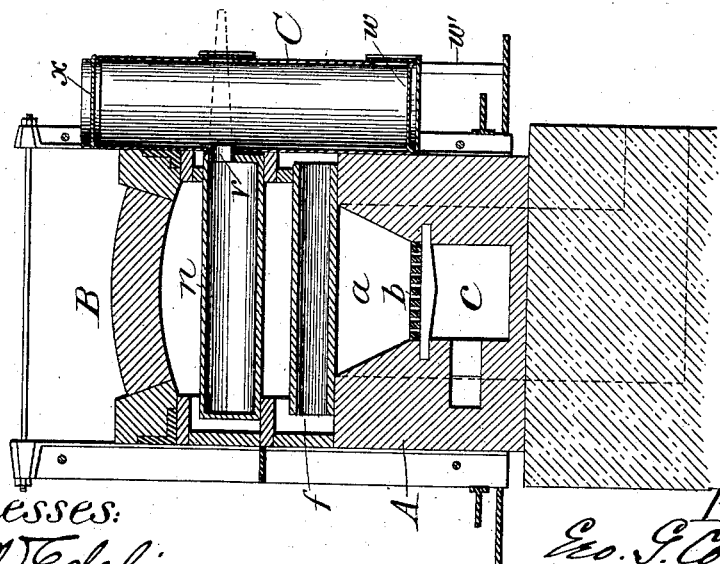
Witnesses:
D. W. Edelin
E. M. Young
Inventors.
Geo. G. Convers,
Arthur B. deSaulles,
by Munn & Goldsborough,
Attys.

No. 727,298. Patented May 5, 1903.

UNITED STATES PATENT OFFICE.

GEORGE G. CONVERS AND ARTHUR B. DE SAULLES, OF SOUTH BETHLEHEM, PENNSYLVANIA.

APPARATUS FOR PRODUCING ZINC-DUST.

SPECIFICATION forming part of Letters Patent No. 727,298, dated May 5, 1903.

Application filed September 14, 1898. Serial No. 690,914. (No model.)

*To all whom it may concern:*

Be it known that we, GEORGE G. CONVERS and ARTHUR B. DE SAULLES, citizens of the United States, residing in South Bethlehem, in the county of Northampton and State of Pennsylvania, have invented certain new and useful Improvements in Apparatus for Producing Zinc-Dust; and we do hereby declare the following to be a full, clear, and exact description of the invention, such as will enable others skilled in the art to which it appertains to make and use the same.

In an application of even date herewith, Serial No. 690,911, we have described a method of obtaining from zinc-bearing material metallic zinc in the finely-divided condition known as "zinc-dust" or "blue powder" and have shown therein two different forms of apparatus adapted for the practice of said method. The present application relates generally to said apparatus, and more specifically to one of the forms thereof.

In the accompanying drawings, Figure 1 represents the apparatus, partly in section and partly in elevation. Fig 2 represents a cross-sectional view thereof with one of the collectors in place. Fig. 3 represents said collector in front elevation and on a somewhat larger scale. Fig. 4 represents a cross-sectional view of the collector. Fig. 5 represents a rear elevation thereof. Fig. 6 represents a top plan view of the collector-cover, and Fig. 7 represents a side elevation thereof.

Similar letters of reference indicate similar parts throughout the several views.

Referring to the drawings, A indicates the basal portion of the furnace, having the fuel-chamber $a$, grate-bars $b$, ash-pit $c$, and bridge-wall $d$, over which the products of combustion pass to the downtake chimney-flue $e$, as will be readily understood. Upon the side walls of the fuel-chamber rest the open-ended "cannon" $f$, and above them are located the zinc-distilling retorts $n$, the function of the cannon being to distribute the products of combustion about the sides of the retorts and to prevent the retort-bottoms from being subjected to too high a heat. The retorts $n$, as shown, rest upon refractory tiles or bricks built up from the base A of the furnace. Above the retort-chamber is provided with the arch B, and the entire furnace is strengthened and bonded by buckstays and cross-ties, as shown. The retorts $n$ have each an exit-opening $m$ for the zinc-vapors and are charged from the opposite end, which is shown in Fig. 2 as luted up. The corresponding wall of the furnace is removable in order to obtain access to the retorts and cannons.

Adjacent to the vapor-exit ends of the retorts are arranged the collectors C for the recovery of zinc-dust. As indicated in Figs. 2 to 7, these collectors are preferably of general cylindrical form, flattened at the side $s$ adjacent to the furnace and provided with an opening $t$, which registers with the retort-opening $m$, the shortest possible pipe connection or nipple $v$ uniting the two openings. The sheet-metal collector is strengthened by a dished bottom $w$ and is closed at top by a removable slip-cover $x$, adapted, if need be, to receive a quantity of water, so as to regulate the effect, and serving also as a safety-valve should undue pressure develop in the collector. At its lower portion it is provided with a door or slide $z$, covering an opening for the removal of the zinc-dust, and at a point opposite the retort it is provided with a door or slide $z'$, having, as shown, a sight-opening $z^2$, through which the interior of the collector may be observed. When disconnected from the retort, the collector may conveniently be manipulated by means of handles $x'$. When in position, it may rest upon any suitable base—as, for instance, the support $w'$.

The retorts or muffles are charged with the zinc-bearing material from the rear end—*i. e.*, from the end opposite to that at which the collectors are located. At the outset a small sheet-iron cone (indicated in dotted lines in Fig. 2) is attached to the retort-nipple for the purpose of catching the oxid of zinc that is given off at the beginning of the operation. As soon as the color of the deposit at the outer end of the sheet-iron cone indicates the formation of zinc-dust the cone is removed and slide $z'$ is closed. The distillation is then continued until the fumes escaping at a small hole $z^3$ (see Fig. 3) near the top of the collector begin to show again the presence of oxid of zinc. The sheet-iron cone or prolong is thereupon again placed in communication with the retort-nipple, so as to catch, as in the first instance, the oxid of zinc that is being formed, thereby preventing its admixture with the zinc-dust already collected. The rear end of the retort or muffle is then opened, the spent charge is withdrawn, and the muffle is freshly charged. The operation is then repeated, although in general the zinc-dust from each charge is removed from the collector before the fresh charge begines to distil.

The size of the collector will depend upon the richness of the charge and the corresponding volume of the zinc-vapors. In practice we have found that a condenser four feet high and two feet in diameter will collect two hundred and sixty pounds of zinc-dust in twenty-four hours.

Having thus described our invention, what we claim is—

1. Apparatus for the recovery of zinc-dust or blue powder, comprising a zinc-distilling muffle, a furnace for heating the same externally, and a collecting and expansion chamber immediately adjacent to the muffle and of such relative size and capacity as to be kept heated by the zinc-vapors and to precipitate said vapors therein in their substantial entirety as zinc-dust; substantially as described.

2. Apparatus for the recovery of zinc-dust or blue powder, comprising a zinc-distilling muffle, a furnace for heating the same externally, and a collecting and expansion chamber having a thin wall provided with an orifice registering with the vapor-outlet end of the muffle, and a short nipple sealing the joint between the muffle and the chamber, said chamber being of such relative size and capacity as to be kept heated by the zinc-vapors and to precipitate said vapors therein in their substantial entirety as zinc-dust; substantially as described.

In testimony whereof we affix our signatures in presence of two witnesses.

GEORGE G. CONVERS.
ARTHUR B. DE SAULLES.

Witnesses:
OSWIN W. SHELLY,
EDWARD J. MALLOY.